P. SWANSON
April 26, 1932. GRAVITY LOCK Re. 18,442
Original Filed Oct. 3, 1927
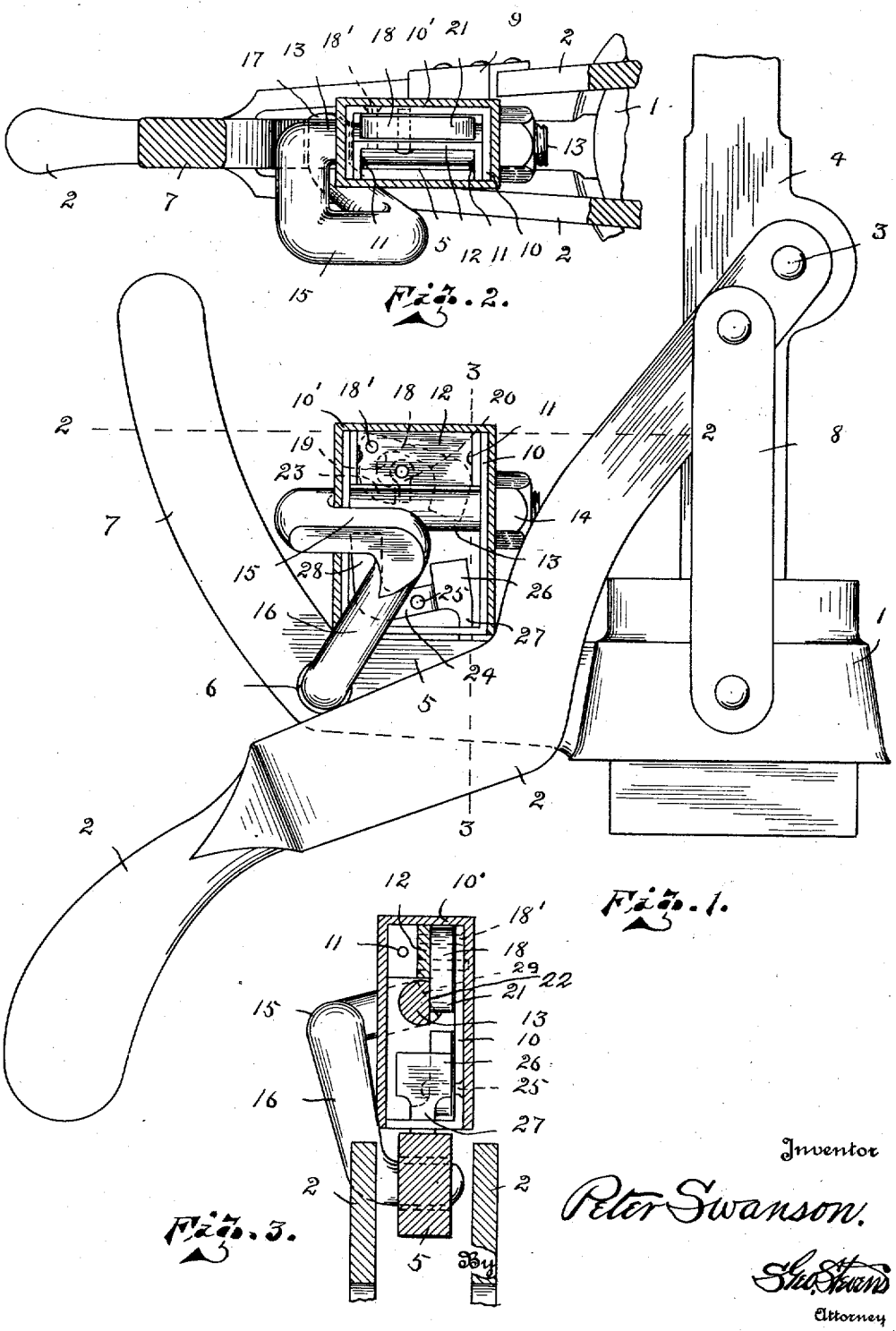
Inventor
Peter Swanson.
By Geo. H. Evans
Attorney Reissued Apr. 26, 1932

Re. 18,442

UNITED STATES PATENT OFFICE

PETER SWANSON, OF ELY, MINNESOTA

GRAVITY LOCK

Original No. 1,786,582, dated December 30, 1930, Serial No. 223,673, filed October 3, 1927. Application for reissue filed November 9, 1931. Serial No. 574,022.

This invention relates to locks and refers to one particularly adapted for use on common railroad switches.

The principal object is to produce a novel and simple form of lock more efficient than those at present employed.

Other objects and advantages will appear in the further description of the invention.

Referring now to the accompanying drawings, forming part of this application, and wherein like reference characters indicate like parts:

Figure 1 is a side elevation of the upper portion of a switch stand and the staff adjacent same showing my improved form of lock attached thereto with the side of the cover of the lock removed;

Figure 2 is a horizontal section taken on the line 2—2, Figure 1; and

Figure 3 is a vertical section on the line 3—3 Figure 1.

1 represents the vertically adjustable head of a common railroad yard switch and which as is well known to those versed in the art must be raised from a cooperative socket in the top of the switch stand before a switch can be thrown, and to accomplish this the switch throwing handle 2 is pivotally attached as at 3 to the target staff 4 of the switch and must be raised. In common practice the switch head 1 has protruding therefrom laterally a lug 5 having a hole therein indicated at 6 which occurs above that portion of the handle which straddles same when closed, and into which hole a common padlock is used. In my preferred form of novel lock installation I extend the lug 5 from adjacent the hole 6 upwardly and arcuately as at 7, the radius of which is from the pivotal point 3 of the handle, and 8 represents one of the links of which there are two which operate the head 1 when the handle 2 is raised and lowered, the latter being bifurcated from the extreme outer handle portion to the staff 4. To one side of one of the bifurcated portions of the handle as at 9 is attached in any desired manner a suitable bracket for the support of the lock casing, or it may be found practical to cast the major portion of the casing integral with one or both portions of the handle. The lock case or housing comprises the rectangularly shaped member 10, which is of channel shape in horizontal section. Into the upper portion of the member 10 is installed and secured as by the rivets 11 a shallow similarly shaped member 12, the central wall of which is approximately centrally of the member 10 and just beneath which is installed the rotative supporting portion 13 of the lock bolt which extends through both opposed walls of the member 10 and is provided beyond the innermost one with a suitable holding nut indicated at 14. However before such latter installation takes place the outer casing 10′ of the lock housing is installed, it being telescopic and fitting down completely over the member 10 and having suitable holes in the opposite walls thereof for registration with the like holes in the walls of the member 10 so that in the installation of the device upon a switch lever the housing is completely assembled with the cooperating elements therein before the bolt is placed in position, rendering it impossible to get at any of the mechanism of the lock without first removing the bolt, the latter being normally held in position by the nut 14 on the end thereof. The locking bolt extends outwardly on the opposite side to which the nut 14 occurs, is turned at right angles to reach beyond the side wall of the housing, and then bent at right angles parallel with the portion 13 as at 15, thence downwardly and backwardly as at 16, and again inwardly at substantially right angles as at 17 for suitable registration within the hole 6 on the lug 5 when such opportunity presents itself. By the lateral extension in this manner it is obvious that the end 17 of the bolt at all times tends to gravitate towards the lug 5, this being an essential element in the proper functioning of the device.

As a locking means for the bolt when the latter is engaged with the lug 5 I provide a dog 18 pivoted as at 18′ intermediate of the plate 12 and the back of the portion 10 of the lock casing. This dog has a cutaway portion 19 which surrounds the keyhole 20 through the side thereof with its heavier end 21 tending to at all times gravitate intermediate of the bolt 13 and the side wall of the case and for cooperation with such tendency I provide a vertical cutaway portion 22 so that when the bolt is in locked position the free end of the dog 18 will drop down in between such cutaway portion and the side wall of the housing as shown in Figures 1 and 3 of the drawings. This dog has an arcuately shaped arm 23 normally functioning on the opposite side and below the keyhole 20 permitting of free insertion of a key in the hole, which when turned upwardly and anticlockwise as viewed from the drawings (for it cannot be turned otherwise due to the lug 23 raising the free heavier end of the dog from engagement behind the body portion 3 of the bolt) will raise the end 21 of the dog 18 and permit the bolt to assume unlocked position, but it will be noted that when the key is thus turned in the lock, and the dog raised, the lug 23 thereof will swing into position opposite the lower end of the keyhole, thus positively preventing the key from being withdrawn from the hole until the dog is permitted to drop and which cannot occur as long as the bolt remains in unlocked position either by the key or otherwise; this being a very essential and novel functioning of the invention, which not only pertains to the direct locking and unlocking of the bolt, but indirectly prevents any possible separation for tampering or the like of the housing.

Now in the embodiment here illustrated, with the switch lug having an elongated arcuately shaped extension thereupon, once the lock is rocked to unlocked position and the handle 2 raised, the locking end of the bolt having no hole with which to register in the extension of the lug will slide thereupon, and while in this position the key cannot be removed from the lock, but once the handle 2 is lowered so that the locking end of the bolt is engaged within the hole 6 in the lug, then the dog 18 may drop into its position for retaining the bolt in such locked position when the lug 23 will swing away from the keyhole and allow the operator to remove his key.

In the event of the lock being used in connection with a switch lug which is not provided with an extension as herein shown, I provide means for holding the bolt in open position, said means comprising the dog 24 mounted within the lock housing beneath the portion 13 of the locking bolt and pivotally supported as at 25. One end of this dog is weighted as at 26 and provided with a downward extension 27 which passes through the lower wall or floor of the lock housing for engagement with the upper edge of the lug 5 when the handle is in its lowermost position. The opposite end of the dog 24 is turned upwardly as at 28 for engagement intermediate of the body 13 of the locking bolt and the wall of the housing or case, similar to the heavier end 21 of the dog 18 only from the opposite side of the bolt and alternately with same, that is to say, when the lever 2 is lowered to its extreme position, the weighted end of the dog 24 will be raised so that the opposite tail end will not occur intermediate of the wall of the case and the bolt, but when the bolt is unlocked and raised by hand to its unlocked position, and the handle raised away from the lug 5, the tail 28 of the dog 24 will assume active position by gravity intermediate of the bolt and the wall of the case and hold the bolt in such unlocked position until the handle and lock are again lowered and the weighted end of the dog 24 engages the lug 5. For proper registration of the tail 28 of the dog 24 intermediate of the bolt body and the wall I cut away one side of the body of the bolt as at 29, it obviously being at a different angle from the cutaway portion 22, and the opposite ends of that portion of the bolt within the catch.

It is evident from the above that I have devised an exceedingly simple gravity lock which will remain in unlocked position whether used in connection with an extension of the lug with which it is engaged or not; one that is composed of exceedingly simple gravitating parts; and that is conveniently accessible only when unlocked by the removal of a single nut for repairs or the like; and the same being applicable for switches, car doors, or other heavy service equipment.

Having thus described my invention, what I claim and desire to secure by Letters Patent, is:

1. A gravity lock of the type described comprising a housing, a gravity bolt having pivotal connection within the housing, and means independent of the housing for automatically holding the bolt in unlocked position.

2. A lock of the type described comprising a housing, a rockable bolt pivotally connected to said housing, a key controlled gravity dog for holding the bolt locked, said dog also holding the key against removal when the bolt is in unlocked position.

3. A lock of the type described comprising a housing, a bolt operably connected with said housing, key controlled means for locking the bolt in its locked position, a gravity dog for holding the bolt in its unlocked position, and means whereby the key cannot be removed from the lock until the bolt is in its locked position.

4. A lock of the type described comprising a housing having a key hole therein, a rockable locking bolt pivotally operable within said housing, a key controlled gravity dog pivotally carried by the housing for holding the bolt in locked position, and means carried by said dog for cooperation with the key hole for the purpose described.

5. Locking means for a switch stand having an operating lever comprising in combination a housing carried by the lever, a gravity locking bolt pivotally mounted in the housing, a lug extending from the switch stand for cooperation with the locking bolt, and means whereby when the bolt is in unlocked position it must remain so unless locking the lever.

6. A two-part housing for a key controlled switch lock removably carried by a switch handle including removable means for securely uniting said parts, and means whereby the union of the parts is controlled by the key.

7. In combination a separable housing for a key controlled switch lock, a locking bolt securely uniting the separable parts of the housing characterized by being entirely removable from the housing, for separation of the parts, and means whereby the operation of the key controls the locking bolt.

8. In a key controlled switch lock removably carried by a switch handle, a housing for said lock composed of a plurality of separable parts, means controlled by the key for securely uniting said parts, and means whereby separation of the parts can only occur when the key controlled means is entirely removed from the lock.

PETER SWANSON.